Dec. 4, 1928.  1,694,305
E. ASCARELLI
SWIVELED AXLE FOR MOTOR CARS
Filed April 10, 1926  2 Sheets-Sheet 1
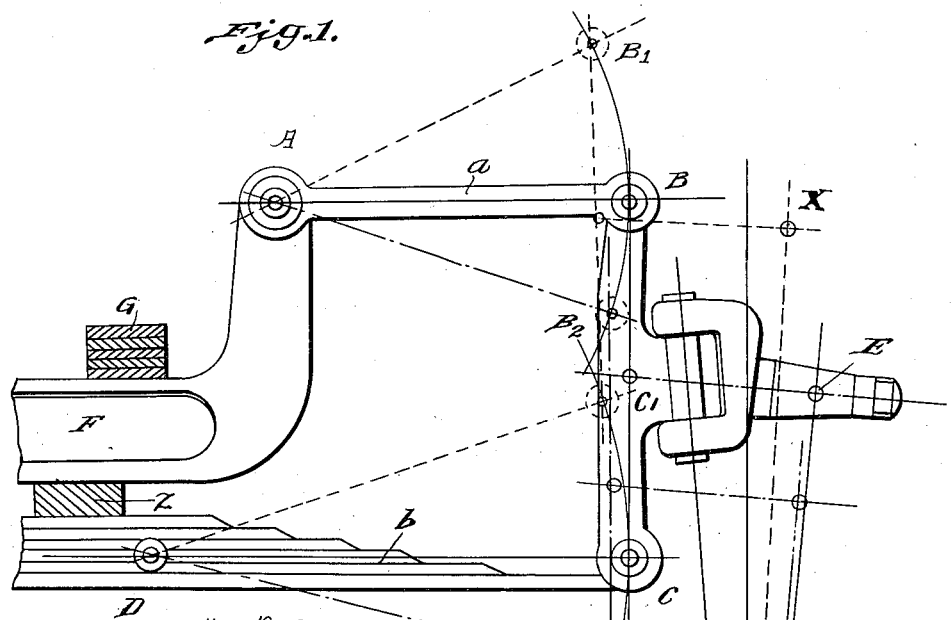
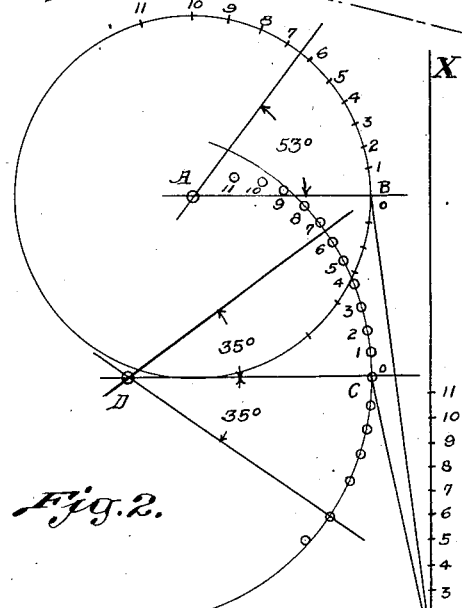
Inventor
ENRICO ASCARELLI Dec. 4, 1928.
E. ASCARELLI
1,694,305
SWIVELED AXLE FOR MOTOR CARS
Filed April 10, 1926
2 Sheets-Sheet 2

INVENTOR
ENRICO ASCARELLI
ATTORNEYS

Patented Dec. 4, 1928.

1,694,305

UNITED STATES PATENT OFFICE.

ENRICO ASCARELLI, OF ROME, ITALY.

SWIVELED AXLE FOR MOTOR CARS.

Application filed April 10, 1926, Serial No. 101,178, and in Italy April 14, 1925.

My present invention refers to supporting or cushioning systems for motor-cars and similar vehicles and has for its object to provide a means for securing a better cushioning by a supporting device independent from the roadwheels, said device preventing wear of pneumatic tires due in ordinary services to the transverse movement to or from each other of the couple of the road-wheels connected to the axle by the usual parallelogram system.

Other purposes will be set forth hereafter.

The invention is illustrated by way of example in the annexed drawings where

Figure 3:
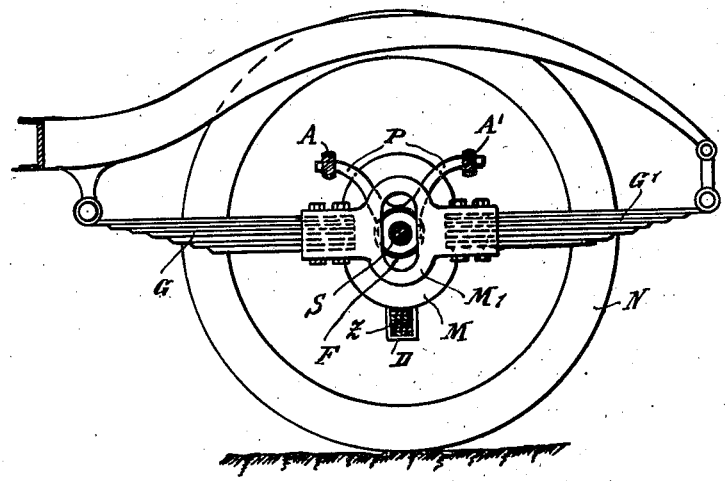
Figure 4:
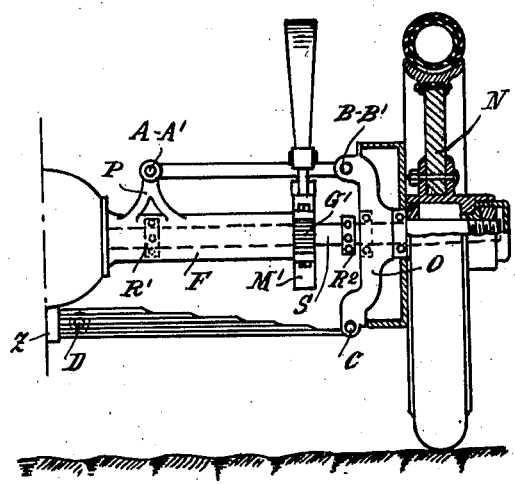

Fig. 1 is a front elevation of a part of the swiveled front axle according to the invention, with a diagram of movements, Fig. 2 is a diagram showing the determination of the center of oscillation (D) according to the invention, Fig. 3 is a longitudinal elevation of the swiveled rear axle according to the invention, and Fig. 4 is a side elevation of Fig. 3.

It is known that the ordinary parallelogram supporting systems produce considerable wear of pneumatic tires owing to the road wheel tending to slide perpendicularly to the direction of movement of the vehicle, whilst, on the contrary, my improved device according to the present invention permits of keeping the point T of contact of the tire with the ground a curve of long radius approximately on a vertical straight line during the movements transmitted to the wheels by the unevenness of the road.

This result is obtained by giving the vibrating levers $a$ (upper) and $b$ (lower) different and suitably proportioned lengths.

Between the points B, or upper hinge, C or lower hinge, and T or the contact with ground there are always constant distances so that they may be considered as points of a rigid body. After the length of lower arm $b$ has been so fixed that the lateral shifting of the point T is reduced to nought, the point T is only capable of moving in an approximately straight line.

The analytical problem (see Fig. 2) is the following:

From the two points B and T of a body, B extending tangentially to a circle of which A—B is a radius, and T in a vertical straight line the third point C is to be determined. This is easily obtained by the graphical representation by points. At this point it is noted that the said curve by an angle of about 70° (which is sure to be superior to the maximum angle of oscillation) coincides with an arc of circumference the center of which gives with great approximation the ideal position of center of oscillation of the lower arm. This is exact if it is admitted that the length D—C is an arm with its ends at a fixed distance. This length may be substituted in practice by a half plate-spring. The variations of the distance occurring between the points D and C when the plate-spring is bent are easily compensated by suitably placing the spring bearing Z behind the point D theoretically fixed.

Fig. 1 shows a modification of the swiveled axle according to my present invention, in which A—B is the upper arm of the system, C—D the plate-spring forming the lower arm, B—C the connection member of the ends of the arms A—B and C—D with the axle pin E. F is the axle on which the frame is supported with the plate-springs G and to which the plate-spring C—D is fixed with the interposed bearing Z. T is the point of contact of the wheel with the ground in normal conditions: $T_1$ and $T_2$ are the positions taken by T in case of unevennesses of the road, and correspondingly $B_1$ $C_1$ and $B_2$ $C_2$ are the positions taken by the points B and C.

In Figs. 3 and 4 my new device is shown as applied to the rear axle where the arm A—B is subdivided in two different parallel and co-operating arms pivotally connected to the supports P fixed to the tube F of the differential gear with the pivotal points A $A_1$, and to a member O corresponding to member B—C of Fig. 1, with the pivotal points B $B_1$.

The plate-springs D C forming the lower arms are, according to this modification, reunited into one fixed at the central point Z to the casing of the differential gear, and at the ends C to the lower end of member O.

Necessarily there have been provided the two cardanic swivels $R_1$ and $R_2$ of the shaft S in order to permit of the oscillation of the wheel N with respect to the casing M of the differential gear which is extended by the tubes F so as to be connected at $M_1$ to the two half plate-springs G and $G_1$.

Shaft S is free to oscillate in F and in the ring $M_1$.

The above described modifications with the lower arm longer than the upper arm may be varied within large limits without departing from the scope of the invention.

Having now fully described my said invention and the manner in which the same is to be performed what I claim and desire to secure by Letters Patent is:

1. A supporting device for the wheels of motor cars, comprising in combination an axle connected to the frame by usual plate springs, an arm hinged to said axle, a plate spring fixed to said axle, a member pivotally connected to said arm and spring and carrying a swiveled axle-journal, all of the said parts with their points of articulation forming a non-parallelogrammatic elastic quadrangle, the two parallel sides of which forming upper and lower vibrating levers of different and suitably proportioned lengths whereby owing to the axle being elastically mounted and the axle-spindle rendered elastic by one side of the quadrangle which functions as a half cantilever, a double suspension is obtained.

2. In a supporting device for the wheels of motor cars, an axle yieldably mounted having an upwardly projecting member, an arm having one end pivotally connected with the member of the axle, a plate spring carried on the lower side of the axle and having one end fixedly mounted, the spring being of a length greater than that of the said arm, a member to the ends of which the ends of the arm and spring are pivoted, and a swiveled axle spindle carried by said member.

3. In a supporting device for the wheels of vehicles, an axle having at its end an approximately right angular and upward projecting member, an arm pivoted to the upper end of said member, a plate spring secured to the under side of the axle a short distance from its end and having its end in the vertical plane of the end of the said arm, a member pivoted to the ends of the arm and spring, and a swiveled axle spindle carried by the said pivoted member at the center of length therof.

In testimony whereof I have hereunto signed my name.

ENRICO ASCARELLI.